Oct. 29, 1929.  C. M. PHILLIPS  1,733,314
SEED TREATING APPARATUS
Filed Sept. 13, 1928  2 Sheets-Sheet 1
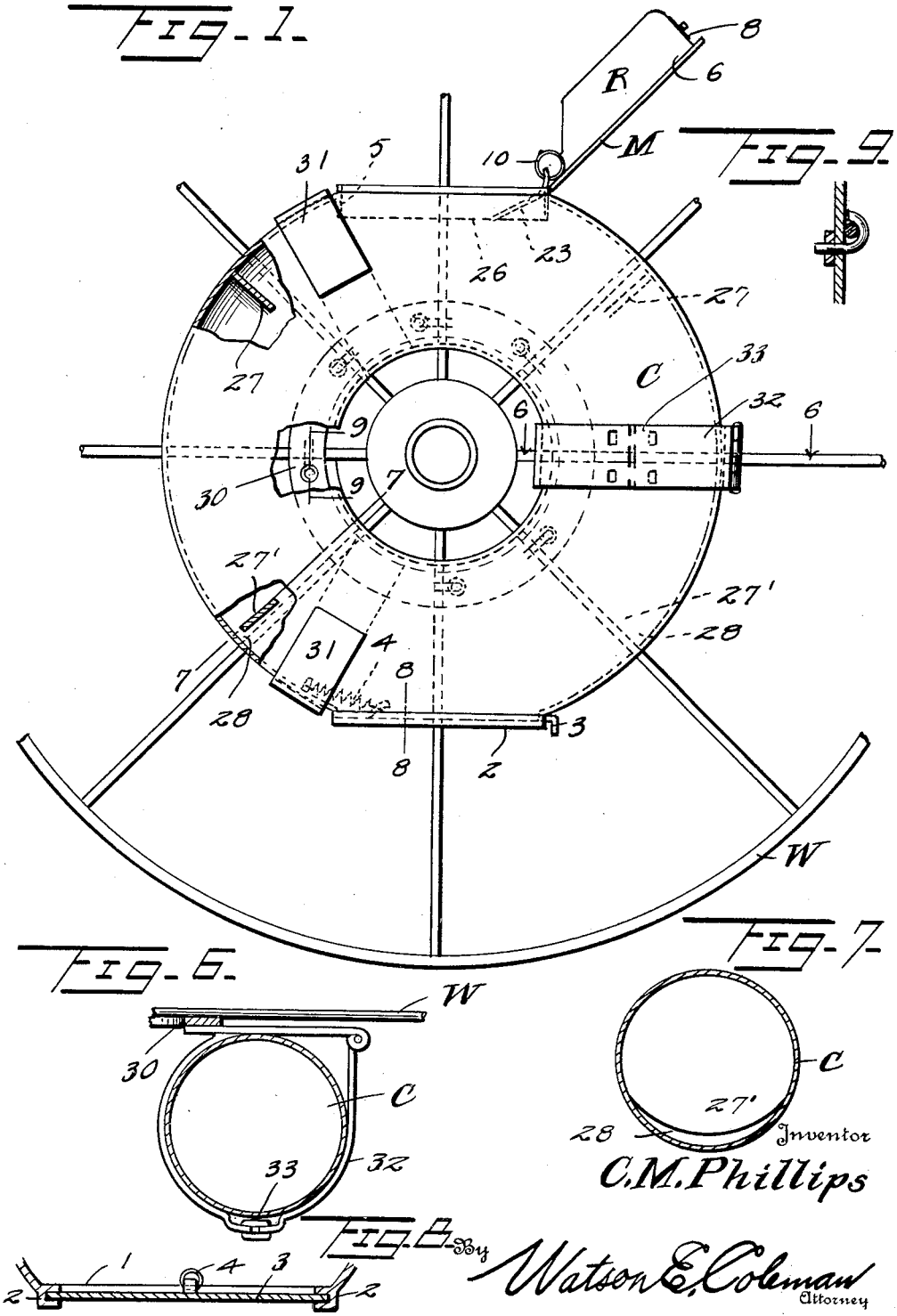

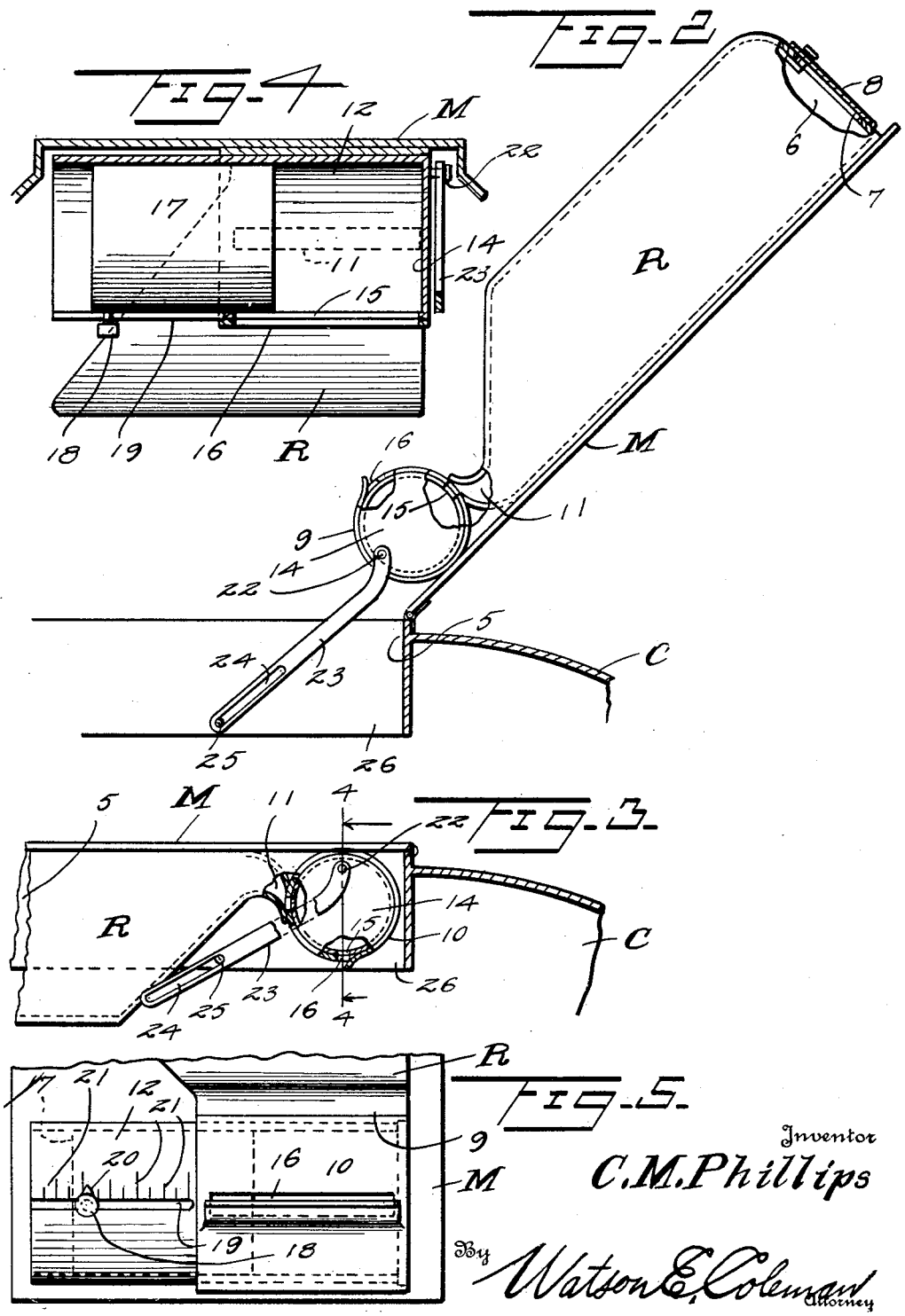

Patented Oct. 29, 1929

1,733,314

UNITED STATES PATENT OFFICE

CURTIS M. PHILLIPS, OF RUDYARD, MONTANA

SEED-TREATING APPARATUS

Application filed September 13, 1928. Serial No. 305,825.

This invention relates to a seed treating apparatus and it is an object of the invention to provide an apparatus of this kind especially designed and adapted for use in the treatment of grain or other seed with copper-carbonate or the like and in a manner whereby is eliminated the liablity of inhaling the copper-carbonate.

Another object of the invention is to provide a device of this kind comprising a container adapted to be rotated to effect the requisite agitation of the materials therein together with means operating in substantially an automatic manner for delivering a predetermined bulk of copper-carbonate within the container.

The invention consists in the details of construction and in the combination and arrangement of the several parts of my improved seed treating apparatus whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in elevation of a seed treating apparatus constructed in accordance with an embodment of my invention with portions broken away and the swinging closure member in open position, an associated drill wheel being shown in fragment;

Figure 2 is an enlarged fragmentary view partly in section and partly in elevation illustrating the swinging closure member in open position;

Figure 3 is a fragmentary view partly in section and partly in elevation illustrating the closure member closed;

Figure 4 is an enlarged fragmentary sectional view taken substantially on the line 4—4 of Figure 3;

Figure 5 is a fragmentary view in bottom plan illustrating means for regulating the discharge from the receptacle carried by the swinging closure member;

Figure 6 is a detailed sectional view taken substantially on the line 6—6 of Figure 1;

Figure 7 is a detailed sectional view taken substantially on the line 7—7 of Figure 1;

Figure 8 is a detailed sectional view taken substantially on the line 8—8 of Figure 1;

Figure 9 is a detailed sectional view taken substantially on the line 9—9 of Figure 1.

In the present embodiment of my invention I disclose my improved apparatus as employed in connection with the ground engaging wheel of a grain drill although I do not wish to be understood as limiting myself in this respect as the apparatus may be otherwise mounted to assure the desired rotation thereof.

As herein disclosed, my improved apparatus comprises an annular tubular container C of requisite dimensions and which is provided at a predetermined point therearound in its outer portion with a discharge opening 1 defined by the outstanding flanges 2 operatively engaged therwith is a sliding closure member or door 3 normally maintained in closed position by the retractile spring 4, one end portion of which being secured to an end portion of the door and the opposite end of the spring being suitably anchored within the container C to the wall thereof. This normally closed door 3 together with the flanges 2 provide means whereby the container C, when not in use, may be readily placed in an upright position upon the ground or other supporting surface.

Substantially diametrically opposed to the opening 1 the outer portion of the container C is provided with a filling opening 5 of desired dimensions and which is adapted to be closed by a cover member M. An end portion of this cover member M is hingedly connected to the container C adjacent to an end of the opening 5 and the member M is adapted to swing outwardly into open position.

Carried by the cover member M and disposed over the inner face thereof is a receptacle R of desired capacity, the cover member M constituting a wall for said receptacle. This receptacle is of a width less than the width of the cover member M and is arranged along one side wall of the cover member M.

The end wall 6 of the receptacle adjacent to the outer or free end of the cover member M is provided with an opening 7 normally closed by the door 8, said opening 7 providing means whereby the desired supply of copper-carbonate or the like may be placed within the receptacle. The lower or inner portion of the end wall 9 adjacent to the hinged end of the member M is continued to provide a barrel 10 disposed along said end wall 9 and providing a throat 11 whereby the copper-carbonate or the like within the receptacle R proper may be readily discharged within the rocking or oscillating measure member 12 snugly engaged within the barrel 10. This measuring member 12 is tubular and has one end permanently closed by a head 14 and is provided in its periphery with an elongated port 15 adapted to register, when in applied position, with the throat 11 so that the material within the receptacle R may be received in desired or predetermined bulk within the measuring member 12. When in a second position, the port 15 registers with a discharge port 16 suitably provided in the periphery wall of the barrel 10 and at which time the member 12 serves to effectively close the throat 11.

The end portion of the measuring member 12 remote from the head or closed end 14 is normally open and slidably and snugly engaged within said open end portion of the member 12 is an elongated plug 17. Extending from the plug 17 adjacent to the outer end thereof is a finger 18 which is disposed through an open slot 19 produced in the peripheral wall of the member 12 and extending lengthwise thereof.

The finger 18 carries a pointer 20 arranged exteriorly of the member 12 and coacting with the indications or graduations 21. By proper adjustment of the plug 17 lengthwise of the member 12 the capacity of the member 12 may be varied in accordance with the amount of copper-carbonate it is desired to deliver within the container C.

The closed end or head 14 of the member 12 adjacent to its periphery is provided with an outstanding pin 22 with which is operatively engaged an end portion of an elongated arm 23. The opposite end portion of this arm 23 is provided therealong with a slot 24 through which is disposed a pin 25 carried by one of the inwardly disposed flanges 26 defining the opening 5 hereinbefore referred to. The slot 24 is of such length that as the cover member M is swung outwardly and before said member reaches full open position the pin 25 will contact with an end of the slot 24 so that the further outward movement of the cover member M will result in sufficient rotation of the measuring member 12 to bring the port 15 into proper register with the thoat 11 so that while the member M is in raised position, the member 12 will be properly filled. As the cover member M is swung downwardly and before it reaches its full closed position, the pin 25 will contact with the opposite end of the slot 24 so that further movement of the member M into full closed position will result in reverse rotation of the member 12 to bring the port 15 into register with the discharge port 16 and at the same time closing the throat 11.

By this it will be seen that when the member M is returned to full closed position the copper-carbonate within the member 12 will be delivered within the container C and in a manner eliminating indiscriminate scattering of the copper-carbonate in the atmosphere.

At predetermined points therearound, and preferably equi-distantly spaced, the container C is provided therein with transversely disposed partitions 27 and 27', the partitions 27' having the opening 1 positioned therebetween. These partitions 27 and 27' are disposed across the outer portions of the container C and provide means to facilitate the effective agitation of the materials within the container and thus assuring the grain or other seed to be properly admixed with the copper-carbonate discharged within the container. The outer portions of the partitions 27' are cut away to provide openings 28 so that when the container C is in a position to discharge the contents of the container through the opening 1, complete discharge is assured.

In the present embodiment of my invention the container C is adapted to be carried by the ground engaging wheel of a drill so that said container may be properly rotated during a planting operation to prepare another batch of seed.

The drill wheel W has clamped thereto by the U-shaped bolts 29 or the like an annular member 30 which, when applied, is concentric to the hub of the wheel.

At predetermined spaced points this member 30 is provided with an outstanding hook member 31 adapted to be engaged with the container C and at a point substantially midway of the members 31 the annular member 30 is provided with the articulated hook members 32 adapted to be disposed around the applied container C and suitably locked, as at 33, one to the other whereby the container C is effectively maintained in applied position upon the drill wheel W.

In practice, it is to be understood that the amount of copper-carbonate to be delivered within the container C will be dependent upon the amount of grain or seed placed within the container. In practice, I find it of advantage to have the container of such capacity to readily hold between one and one-half and two bushels of grain and I also find that it only requires the drill to travel a relatively short distance before the grain becomes effectively treated by the copper-carbonate placed within the container.

As is well known, copper-carbonate is extremely poisonous if inhaled and with my improved apparatus such danger of inhalation is eliminated. After the grain within the container has been properly treated the container C may be readily removed and the treated grain emitted out into the hopper of the drill by opening the door 3. It is also to be noted that with an apparatus as herein disclosed it is only required to treat the amount of grain to be used as seed and it is not necessary to go to the granary to treat more grain or to have a lot of treated grain left over.

In applying my apparatus to a drill no appreciable effect is had in connection with the operation or pulling of the drill.

From the foregoing description it is thought to be obvious that a seed treating apparatus constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An apparatus of the class described comprising a container having an opening in a wall thereof, a closure member for said opening swinging outwardly into open position, a receptacle carried by said closure member and extending within the container when the closure member is in closed position, said receptacle having a discharge opening, a member for controlling the flow through said discharge opening of the receptacle, and means for moving said controlling member into closed position when the closure member is in open position and for moving said controlling member into open position when the closure member is in closed position.

2. An apparatus of the class described comprising a container having an opening in a wall thereof, a closure member for said opening swinging outwardly into open position, a receptacle carried by said member and extending within the container when the closure member is in closed position, a barrel in communication with the receptacle and having a discharge opening, a tubular member rotatably mounted within the barrel and having a port in its peripheral wall for register with the discharge opening when the closure member is closed and for register with the communication between the barrel and receptacle when the closure member is open, said tubular member closing the communication between the barrel and the receptacle when the port of the tubular member is in register with the discharge opening of the barrel, and means for bringing the port of the tubular member into register with the communication between the barrel and receptacle when the closure member is raised and for bringing the port of the tubular member in communication with the discharge opening of the barrel when the closure member is closed.

3. An apparatus of the class described comprising a container having an opening in a wall thereof, a closure member for said opening swinging outwardly into open position, a receptacle carried by said member and extending within the container when the closure member is in closed position, a barrel in communication with the receptacle and having a discharge opening, a tubular member rotatably mounted within the barrel and having a port in its peripheral wall for register with the discharge opening when the closure member is closed and for register with the communication between the barrel and receptacle when the closure member is open, said tubular member closing the communication between the barrel and the receptacle when the port of the tubular member is in register with the discharge opening of the barrel, means for bringing the port of the tubular member into register with the communication between the barrel and receptacle when the closure member is raised and for bringing the port of the tubular member in communication with the discharge opening of the barrel when the closure member is closed, and means for varying the capacity of the tubular member.

4. An apparatus of the character described comprising an annular container, means for supporting the same for rotation, a wall of the container being provided with an opening, a closure member for said opening, a receptacle carried by the closure member and extending within the container when the closure member is closed, said receptacle having a discharge opening, a controlling member for said discharge opening, and means for automatically moving said controlling member into open position when the closure member is fully closed.

5. An apparatus of the character described comprising an annular container, means for supporting the same for rotation, a wall of the container being provided with an opening, a closure member for said opening, a receptacle carried by the closure member and extending within the container when the closure member is closed, said receptacle having a discharge opening, a controlling member for said discharge opening, and means for automatically moving said controlling member into open position when the closure member is fully closed, said means moving the controlling member into closed position with respect to the discharge opening when the closure member is in open position.

6. An apparatus of the class described comprising a container having an opening in a wall thereof, a closure member for said opening swinging outwardly into open position, a receptacle carried by said closure member and extending within the container when the closure member is in closed position, said receptacle having a discharge opening, a member for controlling the flow through said discharge opening of the receptacle, means for moving said controlling member into closed position when the closure member is in open position and for moving said controlling member into open position when the closure member is in closed position, and a second opening in the wall of the container and at a point opposed to the first named opening, and a door for closing said second opening.

7. An apparatus of the class described comprising a container having an opening in a wall thereof, a closure member for said opening swinging outwardly into open position, a receptacle carried by said closure member and extending within the container when the closure member is in closed position, said receptacle having a discharge opening, a member for controlling the flow through said discharge opening of the receptacle, means for moving said controlling member into closed position when the closure member is in open position and for moving said controlling member into open position when the closure member is in closed position, and partitions within the container and partially intersecting the same.

In testimony whereof I hereunto affix my signature.

CURTIS M. PHILLIPS.